United States Patent Office 3,520,742
Patented July 14, 1970

3,520,742
ENCAPSULATION OF PARTICULATE NITRONIUM OXIDIZER SALTS WITH POLYMERIZATION OF ETHYLENICALLY UNSATURATED MONOMERS
Samuel Witz, West Covina, Calif., assignor to Aerojet-General Corporation, Azusa, Calif., a corporation of Ohio
No Drawing. Filed Dec. 31, 1962, Ser. No. 249,552
Int. Cl. C06b 19/02; C06d 5/00
U.S. Cl. 149—7
20 Claims This invention relates to a new and improved method for the polymerization of ethylenically unsaturated monomers. This invention also relates to novel, encapsulated nitronium salts.

It is an object of this invention to prepare high polymers from ethylenically unsaturated monomers by a new process. It is another object of this invention to provide a new catalyst for the polymerization of ethylenically unsaturated monomers. In still another aspect, it is an object of this invention to encapsulate particulate nitronium salts in a polymer of an ethylenically unsaturated monomer. These and other objects of this invention will be apparent from the detailed description which follows:

It has now been found that the nitronium cation is an effective catalyst for the polymerization of ethylenically unsaturated monomers. The nitronium cation is conveniently generated in situ from finely divided, highly conductive, ionic nitronium salts of the formula:

(I) $NO_2Y$ wherein Y is the anion portion of the highly conductive ionic salt. The anion Y may be any negatively charged moiety with groups such as tetrafluoroborate, perchlorate, chloride, sulfide, sulfonate, fluorosilicate, hexafluorostannate, hexafluorophosphate, tetrafluorogallate, hexafluoroarsenate, tetrafluoroaurate, and hexafluoroantimonate being preferred.

The preferred catalysts within the scope of the above formula are selected from the group consisting of nitronium tetrafluoroborate, nitronium perchlorate, nitronium sulfate, nitronium hexafluorostannate, nitronium hexafluorophosphate, nitronium hexafluoroarsenate, nitronium hexafluoroantimonate, nitronium tetrafluoroaurate, nitronium tetrafluorogallate, nitronium sulfonate and nitronium chloride.

The generation of the nitronium ion in situ is normally achieved by either dissolving an effective amount of the finely divided nitronium salt in the monomer, or by employing a mutual solvent for the nitronium salt and the monomer.

In the practice of this invention, any ethylenically unsaturated monomer containing at least one, and up to about three polymerizable carbon-to-carbon double bonds can be polymerized in a polymerization medium containing the nitronium ion. The monomers of this invention, containing one or more $>C=C<$ groups, preferably, although not necessarily, have at least one terminal $CH_2=C<$ group.

Thus, vinyl monomers such as the monolefins of the formula:

$$H_2C=CH=R_1$$

wherein $R_1$ is hydrogen or alkyl, preferably lower alkyl, of from about 1 to 10 carbon atoms such as methyl, ethyl, propyl, and decyl can be polymerized by the process of this invention. Illustrative of such monolefin monomers are ethylene, propylene, 1-butene, 2-butene, 1-hexene and 1-decene. Also suitable to the practice of this invention are diolefins of the formula

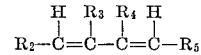

wherein $R_2$, $R_3$, $R_4$ and $R_5$ are hydrogen, halogen, such as fluorine, bromine and chlorine, or lower alkyl of from about 1 to 10 carbon atoms such as methyl, ethyl, pentyl, and decyl. Preferably, the diolefins for use in the process of this invention are selected from the groups consisting of butadiene, isoprene, chloroprene and piperylene.

Still other suitable polymerizable materials for use in my invention are the vinyl and vinylidene halides, cyanides, acids, and esters. Such monomers have the general formula:

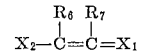

wherein $X_1$ and $X_2$ are hydrogen, halogen such as fluorine, chlorine and bromine, carboxy, cyano or lower acyloxy with the proviso that at least one of $X_1$ and $X_2$ is halogen, cyano, carboxy or lower acyloxy, and $R_6$ and $R_7$ are hydrogen or lower alkyl of up to about 4 carbons. Preferably the lower acyloxy groups contain from 1 to about 10 carbon atoms. Typical monomers of this type are vinyl chloride, vinyl fluoride, allyl chloride, vinyl bromide, vinylidene chloride, vinylidene fluoride, acrylic acid, methacrylic acid, maleic acid, fumaric acid, vinyl acetate, vinyl propionate, acrylonitrile and vinylidene cyanide.

Ethylenically unsaturated aromatic monomers are also polymerizable by the nitronium catalysts of this invention. For example, the aromatic monomers may have the general formula:

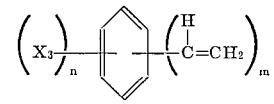

wherein $m$ is an integer having a value of 1 or 2, $n$ is an integer of from about 0 to about 3, and $X_3$ is halogen, preferably chlorine or bromine. Thus, aromatic monomers included in this invention are, for example, styrene, divinyl benzene, monochlorostyrene and dichlorostyrene.

Another class of simple monomers are the well-known substituted and unsubstituted acrylic type of the formula:

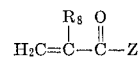

wherein Z is hydrogen, amino, alkoxy or haloalkoxy, and $R_8$ is hydrogen or lower alkyl of from 1 to about 4 carbon atoms. Normally the alkoxy and haloalkoxy groups contain from 1 to about 20 carbon atoms. Most preferred of the lower haloalkoxy groups are those having the general formula:

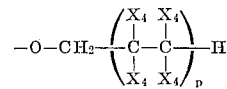

wherein $X_4$ is halogen, more preferably fluorine, and $p$ is an integer from 1 to about 4. Illustrative acrylic monomers within the scope of the above formula include methyl acrylate, methyl methacrylate, acrylamide, acrolein, 2,2,3,3-tetrafluoropropyl acrylate, decyl acrylate, and lauryl acrylate. Another suitable type of monomer is the diacrylates of the formula

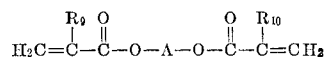

wherein A is a lower alkylene group of from 1 to about 8 carbon atoms such as methylene, ethylene, and octylene, and $R_9$ and $R_{10}$ are selected from the group consisting of hydrogen and lower alkyl radicals of from 1 to about 10 carbon atoms. Typical monomers of the above type include ethylene diacrylate, propylene diacrylate and methylene dimethacrylate.

It is also to be understood that any of the well-known ethylenically unsaturated heterocyclic monomers such as vinyl pyridine, vinylene carbonate, vinyl oxazolidine and N-vinyl pyrrolidone are readily polymerizable in the presence of the nitronium catalysts of this invention.

The nitronium catalysts of this invention are suitable not only for the homopolymerization of the above monomers but various mixtures of the above monomers may be employed in the process to obtain copolymers, terpolymers, block polymers and graft polymers. Thus, there may be obtained in accordance with this invention, polymers such as polyethylene, polypropylene, polyvinylacetate, polyvinylchloride, polyacrylonitrile, polyacrylamide, polystyrene, butadiene-styrene copolymer, vinyl chloride-vinylidene copolymer, styrene-maleic acid copolymer, ethylene-vinylene carbonate copolymer, terpolymers of acrylonitrile, vinyl acetate and vinyl pyridine, or ethylene, propylene and butadiene.

The catalysts of this invention may be used for grafting such as by polymerizing styrene monomer onto a backbone consisting of polybutadiene. Likewise, low molecular weight prepolymers of butadiene and styrene may be interpolymerized to form block copolymers.

In the practice of this invention, it is preferred that the monomers used be capable of dissolving the nitronium salt in an amount of at least about 0.1% by weight, based on total monomers.

Polymerization of this invention may be carried out in bulk; that is, merely by the addition of the catalyst to the monomer. Alternatively, the polymerization can be carried out in the presence of an inert non-polar solvent. Preferred solvents are the halo hydrocarbons such as chloroform, carbon tetrachloride, ethylene dichloride and the like. The use of these solvents is especially desirable to dilute the monomer-catalyst mixture where such mixture possesses a low ignition temperature. Under such circumstances, the use of solvent can reduce the safety hazards otherwise present. The solvent is also useful where the nitronium salt is only very slightly soluble in the monomer. In such case, the solvent can be used to form a solution containing both monomer and catalyst. When a solvent is used, the weight ratio of solvent to total monomers at the initiation of polymerization is in the range of from about 0.1 to about 500.

It is to be understood that polymerization of this invention may optionally be carried out in the presence of various additaments such as fillers; i.e., colloidal silicon and titanium dioxide, and stabilizers.

The nitronium catalysts of this invention are used in an effective catalytic amount ranging from a trace up to about 10% or more by weight based on the total weight of monomers present. The polymerization may be carried out at room temperature or below or up to about 200° F., and, in any case, the polymerization is carried out below the ignition temperature of the polymerization system. The time required for polymerization will vary depending on the monomer employed, the molecular weight desired, and the amount of catalyst utilized. Normally, the polymerization will take place over a period of from about 0.1 to about 200 hours.

The monomer-catalyst mixture may, if desired, be agitated during the course of the polymerization. This technique may be sometimes employed to improve the contact between the catalyst and the monomer and thus improve the rate of polymerization. Normally, the polymerization is conducted at atmospheric pressure, although higher or lower pressures may be used. To assure optimum contact with the catalyst, the monomer is preferably in the liquid phase prior to polymerization. Thus, elevated pressure, as in the case where a low-boiling monomer is polymerized in a closed container, can sometimes be advantageous when employed in the practice of this invention. However, this is not absolutely necessary since contact with the catalyst may also be achieved by dissolving the low-boiling monomer in a suitable solvent, or by lowering the temperature.

The polymers produced in accordance with the practice of this invention are recovered, and any excess catalyst removed in conventional manner; that is, by filtration, washing, and/or extraction.

The following examples are presented for purposes of illustration only. In the examples, the percentages are by weight unless otherwise indicated.

EXAMPLE I

Polymerization of lauryl acrylate

Fifty parts of nitronium perchlorate were added to approximately 300 parts of lauryl acrylate. The mixture was allowed to stand at room temperature for about 16 hours. At the end of this time a very viscous clear homopolymer of lauryl acrylate was obtained.

EXAMPLE II

Polymerization of ethylene diacrylate

Following the procedure set forth in Example I, ethylene diacrylate was polymerized at room temperature for 16 hours. The homopolymeric ethylene diacrylate obtained was a clear hard solid.

EXAMPLE III

Copolymerization of lauryl acrylate and ethylene diacrylate

Three hundred parts of a mixture of lauryl acrylate and ethylene diacrylate were prepared, the mole ratio of the lauryl acrylate to the ethylene diacrylate being 10 to 1. To these mixed monomers was added 50 parts of nitronium perchlorate and the mixture was then allowed to stand at room temperature for 16 hours. At the end of this period, a clear gelatinous copolymer of lauryl acrylate and ethylene diacrylate was obtained.

EXAMPLE IV

Polymerization of $C_9$ fluoroalkyl acrylate

About 5 percent by weight of finely divided nitronium tetrafluoroborate was added to a $C_9$ fluoroalkyl acrylate, having the structural formula:

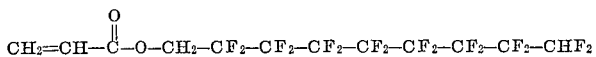

The mixture was held at room temperature for about 120 hours. At the end of this time, a hard waxy homopolymer of the above-mentioned acrylate was obtained.

EXAMPLE V

Polymerization of $C_3$ fluroalkyl acrylate

Following the procedure set forth in Example IV, a $C_3$ fluoroalkyl acrylate of the formula:

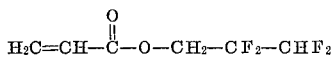

was polymerized in the presence of nitronium perchlorate for 48 hours at room temperature. The product obtained was an elastomeric homopolymer of the $C_3$ fluoroalkyl acrylate.

The preceding example is repeated using a $C_5$ fluoroalkyl acrylate of the formula:

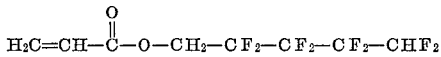

in lieu of the $C_3$ fluoroalkyl acrylate, the polymerization being carried out for 2 days at room temperature. A thick viscous homopolymer is obtained.

EXAMPLE VI

Polymerization of vinyl chloride

To a closed container containing 50 mg. of nitronium perchlorate were added 330 cc. (STP) of vinyl chloride gas. Polymerization was carried out for 2 hours at room temperature. An opaque waxy-like polymer of vinyl chloride was obtained at the end of this time.

EXAMPLE VII

Polymerization of vinylidene fluoride

To a closed container, containing about 150 mg. of nitronium perchlorate were added 202 cc. (STP) of vinylidene fluoride gas. Polymerization was carried out at room temperature. After several hours there was obtained a liquid polymer of vinylidene fluoride.

EXAMPLE VIII

Polymerization of divinyl benzene

To commercial divinyl benzene is added about 5 percent of nitronium perchlorate. After 24 hours at room temperature there was obtained a hard tough polymer of divinyl benzene.

EXAMPLE IX

Polymerization of butadiene

Following the procedure set forth in Example VII, 200 cc. of butadiene dissolved in 1000 cc. of chloroform are polymerized in the presence of about 150 mg. of nitronium sulfate. Polymerization is carried out at room temperature for about 10 to 12 hours. Polymeric butadiene is obtained.

EXAMPLE X

Polymerization of acrylonitrile

Following the procedure of the preceding Example, 100 parts of acrylonitrile are polymerized in the presence of about 5 parts of finely divided nitronium sulfonate. The polymerization is carried out at about 75° F. for about 10 to 12 hours. A good yield of polyacrylonitrile is obtained.

EXAMPLE XI

Polymerization of butyl acrylate

To 100 parts of butyl acrylate is added about 5 parts of powdered nitronium chloride. Polymerization is carried out for several hours at room temperature. A high molecular weight product is obtained. Analysis of the product shows it to be polybutylacrylate.

EXAMPLE XII

Copolymerization of styrene and maleic acid

To 100 parts of an equimolar mixture of styrene and maleic acid dissolved in 1000 parts of chloroform, is added about 5 parts of nitronium hexafluorostannate. Polymerization is allowed to proceed for about 24 hours. At the end of this period there is produced a good yied of styrene-maleic acid copolymer.

The polymers produced in accordance with this invention are of the type well-known to those skilled in the art. Polymers of this type find many uses; for example, in the production of yarns, fibers, films, tires, industrial coatings, and finishes.

As is shown above, the nitronium ion, preferably provided by a finely divided nitronium salt, will catalyze the polymerization of ethylenically unsaturated monomers. In addition, this invention also provides a new method for the encapsulation of particulate nitronium salts. Nitronium salts in particulate form are useful as oxidizers in solid propellant formulations utilized in rockets and missiles. However, these materials present problems of stability and compatibility in such formulations.

It has been found that these problems are avoided by providing the particulate nitronium salt, preferably nitronium perchlorate, with a smooth, continuous, substantially uniform and impervious, adherent surface coating of a polymer of an ethylenically unsaturated monomer or mixture of such monomers. According to my invention, it has been found that this thin coating may be provided by dipping the particulate nitronium salt into the liquid monomer. After a short time, on the order of a few seconds up to 5 or 10 minutes, the thoroughly coated particles are withdrawn. The liquid film of monomer on the surface of the particles is then allowed to polymerize at room temperature or below up to about 200° F. for a period sufficient to completely polymerize all of the monomer present, and normally ranging from about 0.1 to about 200 hours.

While not bound by any theory, I believe that the polymerization of the monomer coating takes place as a result of the dissolution of a small amount of the nitronium salt in the monomer phase. The nitronium ion, therefore, is the effective catalyst for the polymerization.

The discrete particles which can be encapsulated in the foregoing manner may have any configuration such as spheres, jagged or smooth pellets, and the like. Preferably, the particles have an average diameter of from 0.02 inch to one inch.

The encapsulation process of this invention is suitable for any of the nitronium salts within the scope of Formula I, above.

The encapsulation process described above is further illustrated by the example which follows:

EXAMPLE XIII

Several ⅛ inch nitronium perchlorate pellets were dip-coated in the $C_9$ fluoroalkyl acrylate described in Example IV. The pellets were left in contact with the monomer for about 5 minutes. The pellets were removed from the liquid monomer and placed in a closed container which was filled with dry nitrogen gas. The monomer polymerized to a hard, continuous, uniform coating in 24 hours at room temperature.

As can be seen, the encapsulated nitronium oxidizer salts of this invention comprise a particulate nitronium salt containing on the surface thereof a thin, adherent, substantially uniform, continuous coating of any polymer of a monomer which contains at least one polymerizable carbon-to-carbon double bond.

The encapsulated oxidizers of this invention can be used as a partial or total replacement for the oxidizer ingredient in any of the propellant formulations disclosed in assignee's co-pending applications, Ser. No. 829,180, filed July 20, 1959, now Pat. No. 3,245,849, Ser. No. 202,351, filed June 8, 1962, now Pat. No. 3,399,087, and Ser. No. 241,058, filed Nov. 29, 1962.

Having fully described the invention, it is intended that its scope be limited only by the appended claims.

I claim:

1. The method for the manufacture of polymers which comprises polymerizing monomers which contain from one to three polymerizable carbon-to-carbon double bonds in the presence of an effective catalytic amount of the nitronium ion as the polymerization catalyst, and recovering the polymer produced.

2. The method of preparing polymers which comprises polymerizing a monoolefin of the formula:

$$H_2C=C-R_1$$

wherein $R_1$ is selected from the group consisting of hydrogen and alkyl in the presence of an effective catalytic amount of the nitronium ion as the polymerization catalyst, and recovering the polymer produced.

3. The method of preparing polymers which comprises polymerizing a diolefin of the formula $$R_2-\overset{H}{\underset{|}{C}}=\overset{R_3}{\underset{|}{C}}-\overset{R_4}{\underset{|}{C}}=\overset{H}{\underset{|}{C}}-R_5$$

wherein $R_2$, $R_3$, $R_4$ and $R_5$ are selected from the group consisting of hydrogen, halogen, and lower alkyl in the presence of an effective catalytic amount of the nitroium ion as the polymerization catalyst, and recovering the ploymer produced.

4. A method of preparing polymers which comprises polymerizing a monomer of the formula:

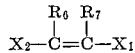

wherein $X_1$ is selected from the group consisting of hydrogen, halogen, cyano, carboxy and lower acyloxy and $X_2$ is selected from the group consisting of halogen, cyano, carboxy and lower acyloxy; and $R_6$ and $R_7$ are selected from the group consisting of hydrogen and lower alkyl, in the presence of an effective cataylic amount of the nitronium ion as the polymerization catalyst, and recovering the polymer produced.

5. The method of preparing polymers which comprises polymerizing an aromatic monomer of the formula:

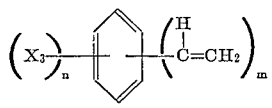

wherein $X_3$ is halogen, $m$ is an integer of from 1 to 2, and $n$ is an integer of from 0 to about 3, in the presence of an effective catalytic amount of the nitronium ion as the polymerization catalyst, and recovering the polymer produced.

6. The method of preparing polymers which comprises polymerizing an acrylic monomer of the formula:

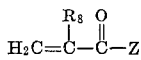

wherein Z is selected from the group consisting of hydrogen, amino, alkoxy and haloalkoxy, and $R_8$ is selected from the group consisting of hydrogen and lower alkyl, in the presence of an effective catalytic amount of the nitronium ion as the polymerization catalyst, and recovering the polymer produced.

7. The method of preparing polymers which comprises polymerizing a diacrylate monomer of the formula:

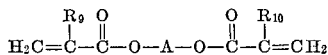

wherein A is a lower alkylene radical and $R_9$ and $R_{10}$ are selected from the group consisting of hydrogen and lower alkyl radicals, in the presence of an effective catalytic amount of the nitronium ion as the polymerization catalyst, and recovering the polymer produced.

8. The method of preparing a polymer of vinyl chloride which comprises polymerizing vinyl chloride in the presence of an effective amount of nitronium perchlorate, and recovering the polymer produced.

9. The method of preparing a polymer of vinyl fluoride which comprises polymerizing vinyl fluoride in the presence of an effective catalytic amount of nitronium perchlorate, and recovering the polymer produced.

10. The method of polymerizing divinyl benzene which comprises carrying out the polymerization of divinyl benzene in the presence of an effective catalytic amount of nitronium perchlorate, and recovering the polymer produced.

11. The method of preparing a polymer of lauryl acrylate which comprises polymerizing lauryl acrylate in the presence of an effective catalytic amount of nitronium perchlorate, and recovering the polymer produced.

12. The method of preparing a polymer of ethylene diacrylate which comprises polymerizing ethylene diacrylate in the presence of an effective catalytic amount of nitronium perchlorate, and recovery the polymer produced.

13. The method of copolymerizing lauryl acrylate and ethylene diacrylate which comprises polymerizing a mixture of lauryl acrylate and ethylene diacrylate in the presence of an effective catalytic amount of nitronium perchlorate, and recovering the polymer produced.

14. The method of polymerizing a fluoroalkyl acrylate which comprises polymerizing a fluoroalkyl acrylate of the formula:

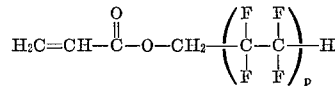

wherein $p$ is an integer of from 1 to about 4 in the presence of an effective catalytic amount of nitronium perchlorate, and recovering the polymer produced.

15. The method of polymerizing a fluoralkyl acrylate which comprises polymerizing a fluoroalkyl acrylate of the formula:

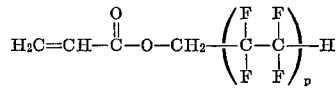

where $p$ is an integer of from 1 to about 4 in the presence of an effective catalytic amount of nitronium tetrafluoroborate, and recovering the polymer produced.

16. The method of claim 15 wherein the polymerization is carried out in the presence of an inert filler.

17. The method of applying an adherent polymeric coating to the surface of a particulate nitronium oxidizer salt which comprises uniformly applying to the surface of the particulate nitronium salt a coating of a monomer which contains from one to three polymerizable carbon-to-carbon double bonds, and allowing said coating to polymerize in place to form an adherent polymeric coating.

18. The method of applying an adherent polymeric coating to the surface of a particulate nitronium perchlorate which comprises uniformly applying to the surface of the particulate nitronium perchlorate a coating of a monomer which contains from one to three polymerizable carbon-to-carbon double bonds, and allowing said coating to polymerize in place to form an adherent polymeric coating.

19. An encapsulated nitronium oxidizer salt comprising a particulate nitronium oxidizer salt containing on the surface thereof a thin, adherent, substantially uniform, continuous coating of a polymer of a monomer which contains from one to three polymerizable carbon-to-carbon double bonds.

20. An encapsulated nitronium perchlorate comprising a particulate nitronium perchlorate containing on the surface thereof a thin, adherent, substantially uniform, continuous coating of a polymer of a monomer which contains from one to three carbon-to-carbon double bonds.

References Cited

UNITED STATES PATENTS 3,006,743   10/1961   Fox et al. _____ 149—19
3,388,015   6/1968   Spenadel et al. _____ 149—19

BENJAMIN R. PADGETT, Primary Examiner

U.S. Cl. X.R.

149—8, 19, 75; 260—41, 41.5, 80, 88.7, 89.3, 89.1, 89.5, 92.1, 92.8, 93.5, 93.7, 94.9